United States Patent
Shaw et al.

(10) Patent No.: US 10,511,880 B2
(45) Date of Patent: Dec. 17, 2019

(54) DEVICE SYNCHRONIZATION

(71) Applicant: PIKSEL, INC., Wilmington, DE (US)

(72) Inventors: Philip Shaw, York (GB); Miles Weaver, York (GB)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 16/105,879

(22) Filed: Aug. 20, 2018

(65) Prior Publication Data

US 2018/0359514 A1    Dec. 13, 2018

Related U.S. Application Data

(63) Continuation of application No. 15/307,536, filed as application No. PCT/EP2015/059600 on Apr. 30, 2015, now Pat. No. 10,057,625.

(30) Foreign Application Priority Data

Apr. 30, 2014    (GB) .................................. 1407618.6

(51) Int. Cl.
| | |
|---|---|
| *H04N 21/43* | (2011.01) |
| *G06F 16/48* | (2019.01) |
| *H04N 21/41* | (2011.01) |
| *H04N 21/439* | (2011.01) |
| *H04N 21/854* | (2011.01) |
| *H04N 21/443* | (2011.01) |

(Continued)

(52) U.S. Cl.
CPC ....... *H04N 21/4307* (2013.01); *G06F 16/489* (2019.01); *H04N 21/4126* (2013.01); *H04N 21/4394* (2013.01); *H04N 21/443* (2013.01); *H04N 21/8456* (2013.01); *H04N 21/858* (2013.01)

(58) Field of Classification Search
CPC ........... H04N 21/4307; H04N 21/4126; H04N 21/4394; H04N 21/443; H04N 21/8456; H04N 21/858
See application file for complete search history.

(56) References Cited

U.S. PATENT DOCUMENTS

| | | | | |
|---|---|---|---|---|
| 2003/0189668 | A1* | 10/2003 | Newnam ................... | H04N 5/04 348/468 |
| 2005/0028195 | A1* | 2/2005 | Feinleib ................. | H04N 7/163 725/32 |

(Continued)

*Primary Examiner* — Alexander Q Huerta
(74) *Attorney, Agent, or Firm* — Holzer Patel Drennan

(57) ABSTRACT

Disclosed is a computer-implemented method of triggering an instance of companion software to perform an expected action related to a piece of media content during a delivery of that media content by a media device to a content consuming user, the method comprising: the instance of the companion software receiving a synchronization signal transmitted when, in delivering the media content, the media device reaches a reference point in the media content, wherein the synchronisation signal conveys a time instant of that reference point; measuring a current elapsed time from the time instant of the reference point; accessing computer storage holding an association of the expected action with a time instant of a trigger point in the media content; and triggering the expected action when the current elapsed time substantially matches the time instant of the trigger point.

15 Claims, 8 Drawing Sheets

(51) Int. Cl.
*H04N 21/845* (2011.01)
*H04N 21/858* (2011.01)

(56) References Cited

U.S. PATENT DOCUMENTS

| | | | | |
|---|---|---|---|---|
| 2006/0031914 A1* | 2/2006 | Dakss | H04H 60/13 | 725/135 |
| 2009/0327894 A1* | 12/2009 | Rakib | G11B 27/34 | 715/719 |
| 2011/0063503 A1* | 3/2011 | Brand | H04N 5/4401 | 348/500 |
| 2011/0320627 A1* | 12/2011 | Landow | H04N 21/47202 | 709/231 |
| 2012/0011550 A1* | 1/2012 | Holland | H04N 21/4126 | 725/78 |
| 2013/0014155 A1* | 1/2013 | Clarke | G11B 27/105 | 725/32 |
| 2013/0096732 A1* | 4/2013 | Hagenme | B62D 15/027 | 701/1 |
| 2013/0132500 A1* | 5/2013 | Vandwalle | H04L 67/104 | 709/208 |
| 2013/0151728 A1* | 6/2013 | Currier | H04N 21/242 | 709/248 |
| 2013/0198642 A1* | 8/2013 | Carney | G06F 3/0484 | 715/738 |
| 2013/0251329 A1* | 9/2013 | McCoy | H04N 21/654 | 386/201 |
| 2014/0059182 A1* | 2/2014 | Miura | H04H 20/18 | 709/219 |
| 2014/0115060 A1* | 4/2014 | Kim | H04L 65/4076 | 709/204 |
| 2015/0046953 A1* | 2/2015 | Davidson | G06K 9/00758 | 725/74 |
| 2015/0100999 A1* | 4/2015 | McKenna | H04N 21/4307 | 725/116 |
| 2015/0249846 A1* | 9/2015 | Klein | A63F 13/12 | 725/109 |
| 2016/0381316 A1* | 12/2016 | Gilson | H04N 5/4403 | 340/12.54 |
| 2017/0347143 A1* | 11/2017 | Limp | H04N 21/4826 | |

* cited by examiner

DEVICE SYNCHRONIZATION

CROSS-REFERENCE TO RELATED APPLICATIONS

The present application is a continuation of U.S. patent application Ser. No. 15/307,536 entitled "Device Synchronization" and filed on Oct. 28, 2016, which is a U.S. national stage entry of International Patent Application No. PCT/EP2015/059600 entitled "Device Synchronization" and filed on Apr. 30, 2015, which claims benefit of priority to United Kingdom Patent Application No. 1407618.6 filed on Apr. 30, 2014, all of which are specifically incorporated by reference herein for all that they disclose or teach.

BACKGROUND

An ever-increasing quantity of media content is being produced that can be consumed (e.g. viewed) by a content consuming user (content consumer) on a media (e.g. viewing) device, such as a television ("TV") or similar. Increasingly, television viewers are using "companion user devices" (such as smartphones, tablets etc.) to supplement their enjoyment of TV-based content. A companion user device is equivalently referred to herein as "companion device" and "user device". The user may be finding more information about a show or movie; they may be commenting about it on social media or they might be looking for other things to watch next.

These interactions are increasingly being joined by other types of engagement which seek to involve the viewer more closely with the content. Examples of this include the companion device offering: polls and votes to rate or respond to events as they happen; quiz questions to allow viewers to play along or contribute to a live event; access to richer content about the main thread such as behind the scenes clips, replays, alternative angles etc.

Existing ACR ("Automatic Content Recognition") techniques go some way towards synchronizing companion device behaviour with the delivery of the primary media content by the media device. For instance, existing "audio watermark" techniques can be used to provide synchronization signals for use by the companion device. Such known watermarking techniques rely on encoding information into audio of the media content in a way that is inaudible to a human ear but which can be decoded from the audio when received via a microphone of the companion device.

One such watermarking technique involves encoding information in the media content audio at a particular (temporal) point which conveys an expected action intended to be performed by the companion device at that point. For instance, where the media content is of a sporting event, the point may be a point at which a goal is scored and the information may be a "goal event" identifier, intended to trigger a goal-related companion device action at that point.

Another such watermarking technique involves encoding reference time instants at various respective reference points in the media content as watermarks. The played-out watermark constitutes a synchronization signal or "heartbeat" that is received by a companion device. The companion device may access stored associations of the reference time instants with expected actions intended to be performed by the companion device. When a synchronization signal encoding a reference time instant is received, an expected action associated with that reference time instant may be triggered in response.

SUMMARY

The inventor has recognized that existing companion device synchronization techniques rely upon the device being able to consistently detect synchronization signals to function properly, and also that synchronization signals are often by their very nature sporadic. The inventor has further recognized that both of these factors can limit the synchronization accuracy achievable using existing synchronization techniques, such as existing ACR.

According to a first aspect the subject matter is directed to a computer-implemented method of triggering an instance of companion software to perform an expected action related to a piece of media content during a delivery of that media content by a media device to a content consuming user, the method comprising: the instance of the companion software receiving a synchronization signal transmitted when, in delivering the media content, the media device reaches a reference point in the media content, wherein the synchronisation signal conveys a time instant of that reference point; measuring a current elapsed time from the time instant of the reference point; accessing computer storage holding an association of the expected action with a time instant of a trigger point in the media content; and triggering the expected action when the current elapsed time substantially matches the time instant of the trigger point.

By supplementing the received timing information about the delivery of the media content with current measurements performed at the companion device, the companion device is able to accurately track the delivery of the media content by the media device in a manner that is robust to sporadic and/or lost synchronization signals.

In embodiments, the instance of the companion software may be executed on a companion device associated with the content consuming user, the synchronization signal being received at the companion device. In other embodiments, the instance of the companion software may be executed on the media device.

In some embodiments, no further synchronization signal is received prior to the step of triggering, and the step of triggering is conditional on the current elapsed time being within an acceptable wait interval from the time instant of the reference point. The method may comprise receiving one or more previous synchronization signals before the synchronization signal, and the acceptable wait interval may have a duration that is dependent on a previous duration pertaining to the received one or more previous synchronization signals. The method may comprise determining a signal confidence value indicative of the reliability of a carrier signal used to convey the received synchronization signal, and the acceptable wait interval may have a duration that is dependent on the determined signal confidence value.

The method may comprise determining a local confidence value based on the current elapsed time and/or based on a determined reliability of a carrier signal used to convey the received synchronization signal, the local confidence value indicative of the likelihood of the expected action being triggered at a correct time, the correct time being when the media device, in delivering the media content, reaches the trigger point; the step of triggering may be conditional on the local confidence value being within a first confidence value limit. If the signal confidence changes to a first value outside of the first limit, the step of triggering may be conditional on the signal confidence value having subsequently changed to a second value within a second confidence value limit, wherein the second confidence value limit does not match the first confidence value limit.

The synchronization signal may be the most recent of a plurality of synchronization signals received by the instance of the companion software at different times.

The synchronization signal may encode the time instant of the reference point, and the method may comprise decoding the synchronization signal to obtain the time instant of the reference point.

When the instance of the companion software is executed on a companion device, the media content may comprise audio data and the synchronization signal may be embedded in the audio data of the media content, the embedded synchronization signal thus being transmitted by the media device in delivering the media content; the embedded synchronization signal may be received via a microphone component of the companion device. Alternatively, the synchronization signal may be received over a communication link via a network interface of the companion device.

When the instance of the companion software is executed on a media device, the media content may comprise audio data and the synchronization signal may be embedded in the audio data of the media content; the instance of the companion software executed on the media device may receive the audio data of the media content containing the embedded synchronization signal.

The method may comprise: the instance of the companion software receiving, after the synchronization signal, another synchronization signal conveying a time instant of another reference point; and triggering a skip action by the instance of the companion software if the current elapsed time does not substantially match the time instant of the other reference point. The time instant of the other reference point may be substantially earlier than the current elapsed time, and the skip action may be a rewind action. The time instant of the other reference point may be substantially later than the current elapsed time, and the skip action may be a fast-forward action.

Performing the expected action may comprise the instance of the companion software delivering auxiliary content to the content consuming user.

The step of delivering the auxiliary content comprises displaying the auxiliary content on a display screen of the companion device or a display screen of the media device.

The method may be performed by a companion device in a network of companion devices, and may further comprise transmitting timing information derived from the current elapsed time over the network for receipt by other companion devices in synchronizing with the delivery of the media content by the media device.

According to a second aspect, the subject matter is directed to a computer system for performing an expected action related to a piece of media content during a delivery of that media content by a media device to a content consuming user, the computer system comprising: an input configured to receive a synchronization signal transmitted when, in delivering the media content, the media device reaches a reference point in the media content, wherein the synchronisation signal conveys a time instant of that reference point; and a processor configured to measure a current elapsed time from the time instant of the reference point, to access computer storage holding an association of the expected action with a time instant of a trigger point in the media content, and to trigger the expected action when the current elapsed time substantially matches the time instant of the trigger point.

The computer system may be embodied in a companion device for associating with the content consuming user, the input being an input device of the companion device. Alternatively, the computer system may be embodied in a media device.

According to a third aspect, the subject matter is directed to a computer-implemented method of synchronizing a companion device, in a network of companion devices, with a delivery of a piece of media content by a media device, the method comprising: detecting whether a master synchronization source is available to the companion device and selecting a first mode of operation if so, wherein operating in the first mode comprises: receiving at the companion device synchronization signals from the master synchronization source, the synchronization signals transmitted when, in delivering the media content, the media device reaches respective reference points in the media content, wherein the synchronisation signals convey respective time instants of those reference points, determining timing information relating to a current point in the delivery of the media content based on the received reference signals, and transmitting the determined timing information for use by other companion devices in the network.

The method may comprise the companion device transmitting a distance measure which indicates that master synchronization source is available to the companion device, the transmitted distance measure for use by other companion devices in the network in selecting that companion device as a synchronization source. The method may comprise the companion device transmitting a device identifier of the companion device for use by other companion devices in the network in selecting that companion device as a synchronization source.

According to a fourth aspect, the subject matter is directed to a computer-implemented method of synchronizing a companion device, in a network of companion devices, with a delivery of a piece of media content by a media device, the method comprising: detecting whether a master synchronization source is available to the companion device and selecting a second mode of operation if not, wherein operating in the second mode comprises: receiving from another companion device in the network timing information relating to a current point in the delivery of the media content, accessing computer storage holding an association of an expected action with a time instant of a trigger point in the media content, and triggering the companion device to perform the expected action when the received timing information indicates that the media device, in delivering the media content, has reached the trigger point.

The method may comprise retransmitting the received timing information for use by other companion devices in the network.

The method may comprise selecting the other companion device for receiving the timing information from a plurality of other companion devices in the network that also transmit respective timing information.

The method may comprise receiving, from each of the plurality of other companion devices, a respective distance measure indicative of a distance from that companion device to the master synchronization source, wherein the other companion device is indicated to be closest to the master synchronization source and is selected on that basis. The respective distance measure may convey a respective number of intermediate companion devices via which that companion device is connected to the master synchronization source, the other companion device being connected to the master synchronization source via the smallest number of intermediate companion devices and being selected on that basis. The smallest number of intermediate companion devices may be zero. The companion device may transmit a further distance measure for use by further companion devices in the network in selecting that companion device as a synchronization source, the further distance measure based on the respective distance measure received from the other companion device.

The method may comprise receiving a respective device identifier transmitted by each of the plurality of other companion devices, wherein the step of selecting is based on the respective device identifier of the other companion device. The companion device may transmit a device identifier of the companion device for use by other companion devices in the network in selecting that companion device as a synchronization source.

According to a fifth aspect, the subject matter is directed to a network of companion devices wherein each companion device in the network is operable to implement the methods of the third and fourth aspects.

According to a sixth aspect, the subject matter is directed to a companion device for use in a network of companion devices, the companion device comprising: a network interface; a processor configured to detect whether a master synchronization source is available to the companion device and to select a first mode of operation if so; and an input configured when operating in the first mode to receive from the master synchronization source synchronization signals transmitted when, in delivering a piece of media content, a media device reaches respective reference points in the media content, wherein the synchronisation signals convey respective time instants of those reference points; wherein the processor is configured when operating in the first mode to determine timing information relating a current point in the delivery of the media content based on the received reference signals; and wherein the network interface is configured to transmit the determined timing information for use by other companion devices in the network.

According to a seventh aspect, the subject matter is directed to a companion device for use in a network of companion devices, the companion device comprising: a processor configured to detect whether a master synchronization source is available to the companion device and to select a second mode of operation if not; and a network interface configured when operating in the second mode to receive from another companion device in the network timing information relating to a current point in a delivery by a media device of a piece of media content; wherein the processor is configured when operating in the second mode to access computer storage holding an association of an expected action with a time instant of a trigger point in the media content, and to trigger the companion device to perform the expected action when the received timing information indicates that the media device, in delivering the media content, has reached the trigger point.

According to an eighth aspect, the subject matter is directed to a computer program product comprising executable code stored on a computer readable storage medium, the code configured when executed to implement any of the methods disclosed herein.

According to another aspect, the subject matter is directed to a computer-implemented method of triggering a companion device, associated with a content consuming user, to perform an expected action related to a piece of media content during a delivery of that media content by the media device to the content consuming user, the method comprising: receiving at the companion device a synchronization signal transmitted when, in delivering the media content, the media device reaches a reference point in the media content, wherein the synchronisation signal conveys a time instant of that reference point; measuring a current elapsed time from the time instant of the reference point; accessing computer storage holding an association of the expected action with a time instant of a trigger point in the media content; and triggering the expected action when the current elapsed time substantially matches the time instant of the trigger point.

BRIEF DESCRIPTION OF FIGURES

To aid understanding of the subject matter and to show how the same may be carried into effect, reference will now be made to the following drawings in which.

DESCRIPTION OF EMBODIMENTS

Embodiments will now be described by way of example only.

Figure 1:
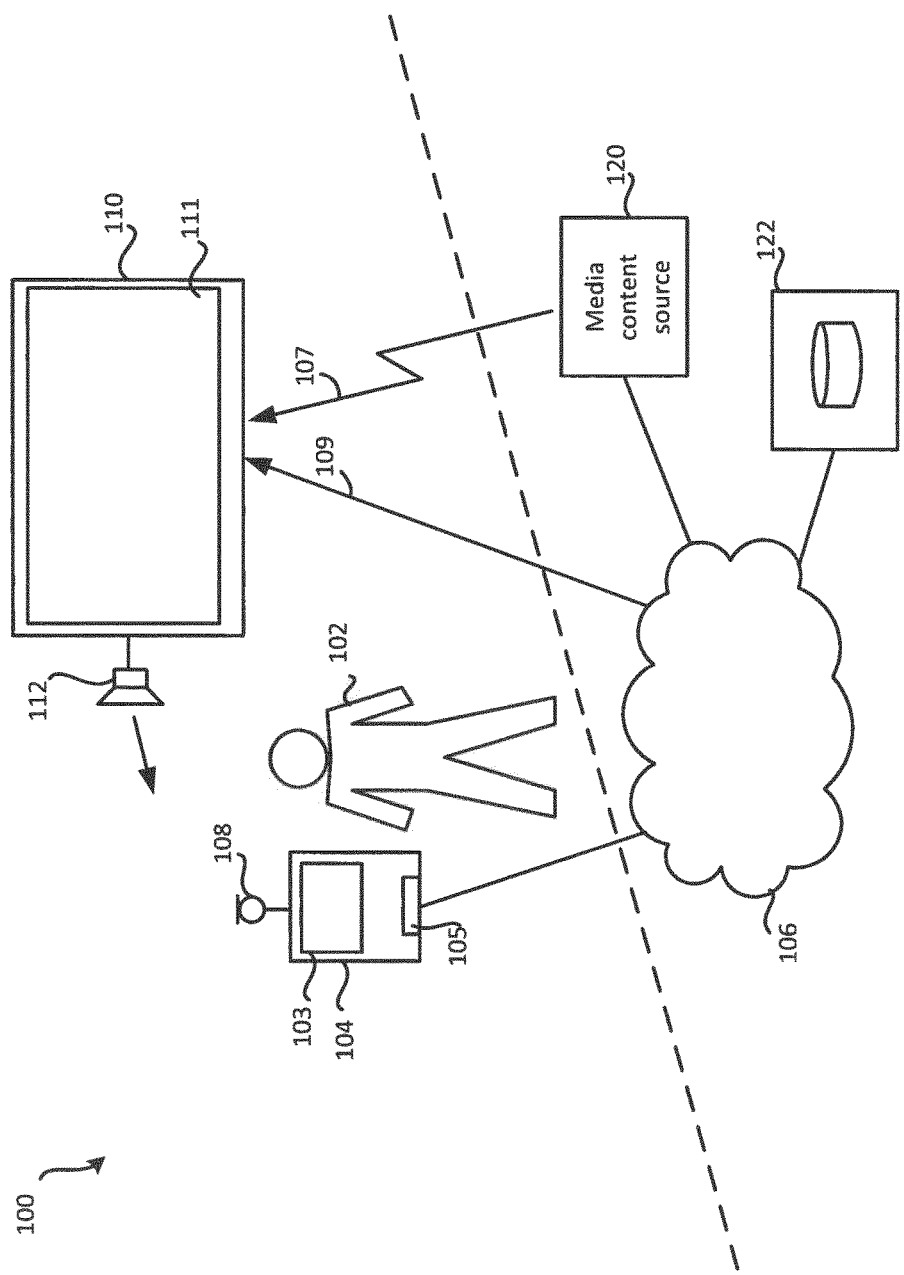
FIG. 1 is a schematic diagram of media and companion devices.

FIG. 1 shows two devices which can be provided for a content consuming user 102 in a particular location. FIG. 1 illustrates a media device for delivering media content to the user 102, such as a viewing device in the form of a television 110 with a display screen 111 and a loudspeaker 112 for outputting video and audio of the media content respectively. In accordance this embodiment, the loudspeaker 112 outputs audio of the media content which includes embedded synchronization signals. This is discussed in detail below. The user 102 also has, and is associated with, a companion user device 104 which is available to the user 102. This user device can take the form of any kind of computer device including but not limited to tablets, mobile phones, smartphones, laptops, etc. In particular, the user device 104 has a display screen 103 for displaying elements to the user and a microphone 108 for receiving audio, such as the audio of the media content when delivered by the viewing device 110 which includes receiving the synchronization signals embedded in that audio. This is discussed in detail below. The user device 104 also has a network interface 105 for establishing a network connection to allow the user device 104 to communicate with a control server 112 via a network 106 such as the Internet. The network connection can be wired such as Ethernet or wireless (e.g. WiFi or GSM), or any suitable interface which allows the user device 104 to communicate with the control server 122. A content source server 120 is also provided which is connected to the network 106 and can deliver content to the media device 110. This can be achieved via an internet channel over the network 106 or a broadcast channel, denoted 107 in FIG. 1. The content source can be part of the network and accessible accordingly (see line 109). The dotted line in FIG. 1 denotes the fact that the user device 104 and media device 110 are likely to be in the same physical location, such as a room, while the servers 120 and 122 are likely to be in a remote location. The servers 120 and 122 are shown as separate computer devices, but their functions could be carried out in a single server, and/or at least some of their respective functions could be distributed across multiple servers.

Figure 2:
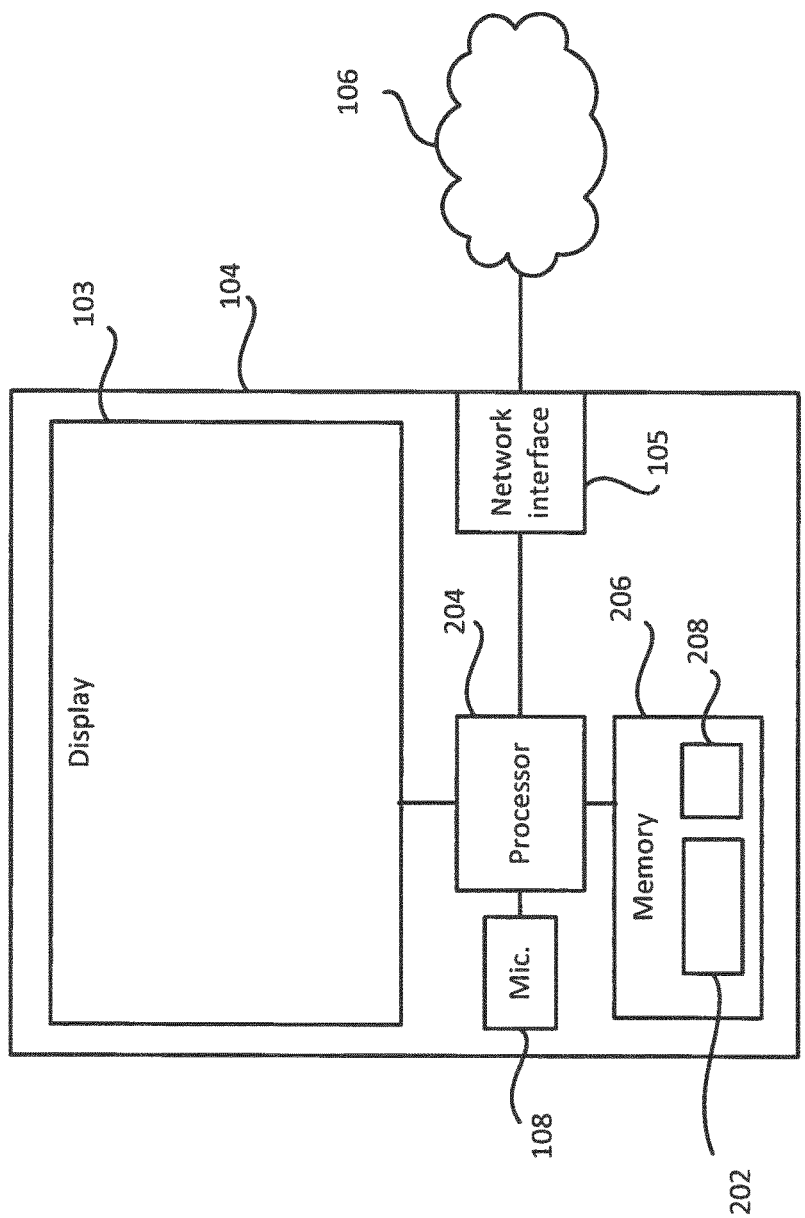
FIG. 2 is a schematic block diagram of a companion device.

FIG. 2 is a schematic block diagram of the user device 104. As shown, the user device 104 comprises the display screen 103 which is an output device of the companion device, the microphone 108 which is an input device of the companion device, and a network interface 105 which acts as both an input and an output device of the companion device.

The user device also comprises a processor 204, comprising one or more Central Processing Units (CPUs), which is connected to a memory 206. The memory is a non-transitory computer-readable storage medium such as a magnetic or electronic memory which holds code for execution by the processor and includes applications which can be executed by the processor 204. In this case, the applications (apps), include companion software which, in this embodiment, is in the form of a companion application 202. The memory 206 also holds a set of associations 208, each association associating a time instant of a (temporal) trigger point in a particular piece of media content (comprising both audio and video data in this embodiment) with an expected action intended to be performed by the companion device, as discussed below.

The user device may comprise further components, such as other output devices e.g. one or more loudspeakers or similar for outputting audio, or other input devices. Further, whilst one only microphone is shown, alternative user devices may comprise one or more microphones.

Executing the companion application 202 on the processor 204 causes the processor 204 to perform the expected actions related to the piece of media content during a delivery of that media content by the media device 110 to the content consuming user 102. Each expected action associated with a respective (temporal) trigger point in the piece of media content is performed when (and only when) the media device, in delivering the piece of media content, reaches that respective trigger point. The expected actions are thus synchronized to the delivery of the media content by the media device 110. For example, an expected action may relate to an event occurring in the media content at an associated trigger point—e.g. a particular object or person becoming visible in the media content video. That expected action is then triggered when the media device reaches that trigger point so as to coincide with that event—e.g. to coincide with that person or object becoming visible on the screen 111 of the media device 110.

Examples of expected actions to be performed at trigger points include the companion device delivering auxiliary content to the user 102 at the associated trigger point which the companion device obtains from the control server 122, for instance related audio, video and/or text-based auxiliary content that is relevant to the primary media content at that point. This includes, for example, displaying a play-along question that is related to a particular event in the media content occurring at an associated trigger point, revealing the answer to that question at a later trigger point, displaying a selectable replay option at a trigger point occurring at the end of a section of the media content which the user can select to replay that section of the media content on the companion or viewing device etc.

Figure 4A:
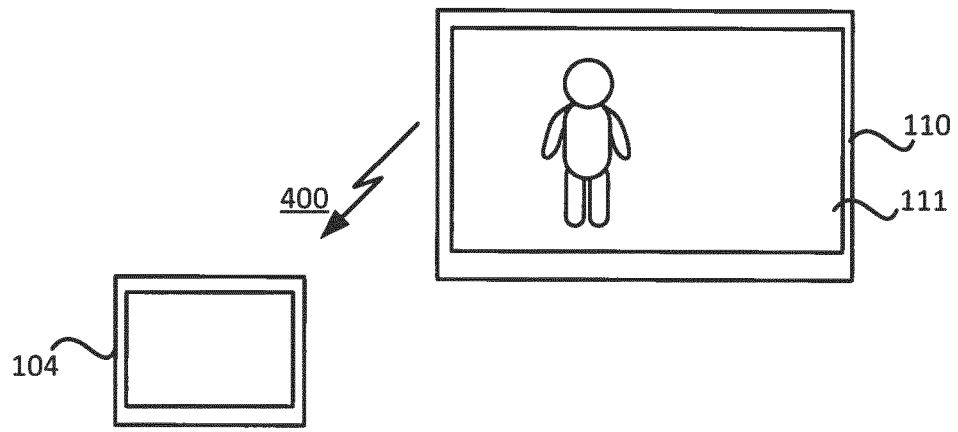
FIGS. 4A and 4B schematically illustrate synchronized behaviour of a companion device.
Figure 4B:
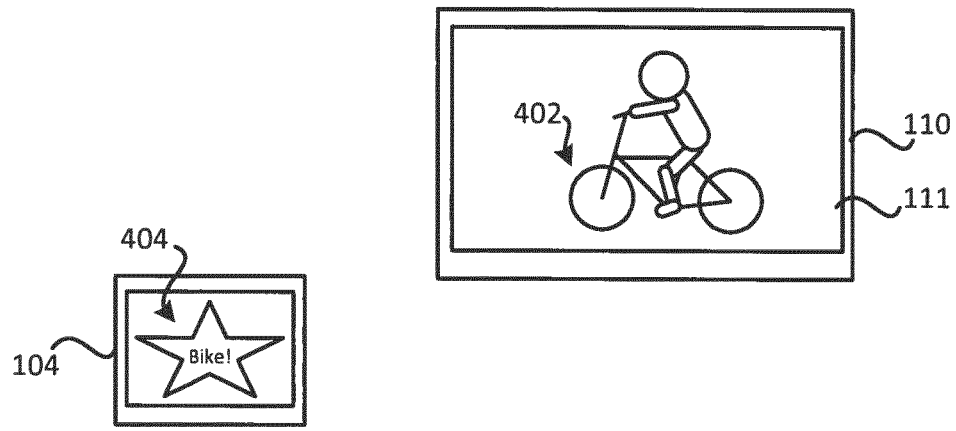

An example is illustrated in FIG. 4B which shows the media device 110 and the companion device 104 during a delivery of a piece of media content at a particular time instant of a trigger point in that media content. This trigger point is a point at which a bicycle 402 becomes visible in the video of the media content. The processor 204 is configured to display, at that time instant, a synchronization element 404 so as to coincide with the display of the bicycle 402 on the screen 111 of the media device 110 e.g. a selectable notification which includes information about the bicycle 402 (from server 122) which the user 102 can select to obtain more information.

Each of these types of interaction share a need to be closely synchronised with the main content. For instance, when a play-along question is asked, it is important for an at-home viewer 102 to see it at the right time and for the answer to be revealed at an appropriate juncture. Likewise for replay clips, these should only be offered after the play itself. In each case (and others), it will be apparent that accurate synchronisation is important to provide a meaningful and enjoyable experience for the viewer.

Without accurate synchronisation, this sort of interactivity loses its appeal and its usefulness. Having an accurately synchronised experience helps the content consumer (e.g. viewer) become engaged and immersed in the piece of media content (e.g. program) they're consuming (e.g. watching).

As indicated, existing Automatic Content Recognition (ACR) solutions go some way to providing a degree of synchronization between a companion device and a media device. Existing ACR solutions involve, for instance, a companion device triggering an expected action associated with a trigger point in response to receiving a synchronization signal (heartbeat) encoding a time instant of that trigger point.

However, the inventor has recognized that such heartbeats are by their nature sporadic, and that existing techniques that make use of heartbeats rely upon this device being able to consistently detect them. Real-world testing of exiting ACR has revealed that it is not realistic to assume that every ACR signal will be detected successfully. Background noise, users covering the microphone inadvertently; leaving the room briefly or temporarily muting the TV volume all conspire to reduce the effectiveness of ACR as it stands as the sole solution for accuracy.

The inventor has therefore recognized that, for at least these reasons, it is not practical to rely upon these heartbeat signals alone to trigger expected actions. In accordance with the present disclosure, the companion device is thus configured to supplement these heartbeat signals with time measurements, thereby increasing the accuracy and robustness of the companion device synchronization, as described hereinbelow.

Figure 3:
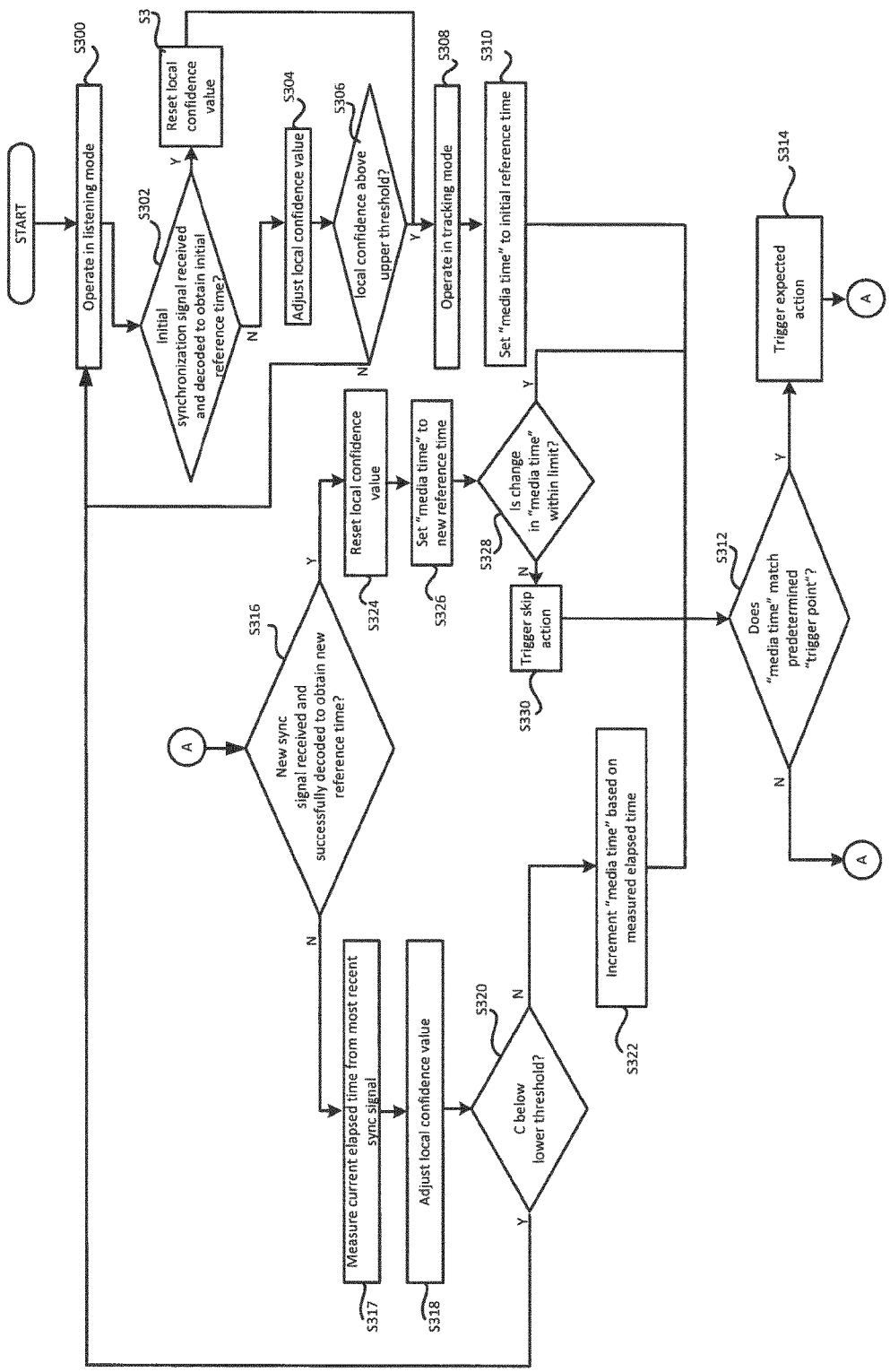
FIG. 3 is a flow chart for a method of synchronizing companion device actions with a current media content delivery by a media device.

FIG. 3 is a flow chart for a method of synchronizing companion device actions with a current delivery of a piece of media content by a media device, in which timing information conveyed by synchronization signals is supplemented with time measurements. The method is performed during the delivery of the media content by the media device, and enables the companion device to track that delivery. The method is a computer-implemented method, implemented by executing the companion application 202 on the processor 204.

Each synchronization signal is transmitted by the media device when, in delivering the piece of media content, the media device reaches a respective reference point in the piece of media content, and each conveys respective time instant of that reference point. In this embodiment, each synchronization signal is embedded as an audio watermark in the media content audio at its respective reference point, such that each synchronization signal is transmitted via the loudspeaker 112 as part of the delivery when the media device reaches that reference point, and each watermark encodes the respective time instant of that reference point. In other embodiments, the synchronization signals may be transmitted and received using an underlying technology other than ACR—e.g. Bluetooth or Wifi.

Time instants are encoded as values (e.g. hh::mm:ss.ssss—that is, hours, minutes, seconds, and fractions of a second) relative to a predetermined global reference time. The global reference time may, for instance, be defined by the start of the piece of media content e.g. a timestamp coded into a point 3 minutes and 23 seconds from the start of the media content may have a value of "0:03.23" indicating that a media device delivering the media content is expected to reach that point 3 minutes and 23 seconds from commencing that delivery. As another example, the global reference time may be a time of day—for instance, for media content that is to be broadcast on a particular day, the reference time may be 12 AM that day e.g. if the media content is scheduled to be broadcast at 10 AM that day, a timestamp coded into a point 3 minutes and 23 seconds from the start of the media content may have a value of "10:03.23" indicating that a media device delivering the broadcast media content is expected to reach that point at 3 minutes and 23 seconds past 10 AM that day. In this case, the stored association may be between the timestamp as it is encoded in the synchronization signal (e.g. 0:03.23 or 10:03.23) and an associated expected action to be performed by the companion device.

In performing the method, the companion device 104 is able to keep track of a playback offset (current media time instant) of the piece of content being delivered by the media device 110 so that, were the current offset to be displayed on both devices, the readouts would match. Thus, a remote timeline is effectively recreated on the companion device. This is referred to as a "synthetic timeline". It is synthesised from information the companion device receives from the media device. This can be achieved using a heartbeat signal sent from the playback device to the handheld device together with the handheld device's own built-in forecasting logic (implemented by the companion application 202 in this embodiment), which is discussed in detail below. Between heartbeat signals, the synthetic timeline adjusts its view of the current playback time automatically and makes this available to the companion device for tracking the delivery of the media content between heartbeat signals. The synthetic timeline is further adjusted whenever the companion device successfully detects a heartbeat signal.

In this way, the companion device can monitor the synthetic time's offset exactly as though it were a locally played media asset. By extension, the device can associate events with this timeline in order to trigger certain behaviours (actions) at specific offsets including, but not limited, to those actions discussed above.

With the synthetic timeline's timer continuing to tick between heartbeat signals, the collection of events from the underlying timing source can be successfully abstracted—it is, as stated above, now no different from an asset played locally.

The companion device maintains, in memory 206, a current media time instant value and a confidence value (local confidence value). The current media time instant is an estimated time instant of a point in the media content which the media device, in delivering the media content, is currently at (that is, an estimated time instant of a current point in the delivery of the media content). The local confidence value is indicative of the reliability of that estimate. In this embodiment, the confidence value lies between a lower limit (here, zero/0%) and an upper limit (here, one/100%), with lower (resp. higher) confidence values indicating less (resp. more) reliable estimates.

Some technologies (e.g. some ACR, Bluetooth) may provide a signal confidence (e.g. signal strength) value continuously which is used in some embodiments to augment the local confidence value. The signal confidence value is measured at the device 104 and reflects the ability of the device 104 to be able to detect an underlying carrier signal (e.g. ACR carrier, Bluetooth/Wifi carrier) used to convey (e.g. that can be modulated with) the synchronization signals. For instance, within the realm of ACR technologies, some systems also provide ongoing confidence values themselves which reflect the ACR technology's ability to detect an ACR carrier signal. In these cases, this confidence value is used to boost the timeline's own confidence value between expected ACR signals (see below).

This signal confidence value measure is available not only when a synchronization signal is received but also between signals as well. This measure can be extremely erratic in nature. If the underlying signal is ACR, the continuous signal confidence value can drop rapidly when there is a quiet section of content or when the user brushes against the microphone. With a Bluetooth or other wireless link signal, signal strength can vary markedly if the signal is obstructed or the user leaves the room. That is, ACR technologies, and other technologies such as Bluetooth, generally only provide an instantaneous measure of confidence—in contrast, here an ongoing confidence value is derived based on the trend of this changing figure, missing heartbeats and so on e.g. based on a moving average of the measured signal confidence.

When the underlying technology does not provide any continuous confidence (e.g. signal-strength) value, the companion software simply decays its calculated local confidence value evenly until either the next signal is heard or the value decays below a lower threshold (see below).

With a continuous confidence (e.g. signal-strength) value, the companion software can augment the calculated confidence value with a smoothed, measured continuous confidence value to make a better/quicker assessment of when an item of content has stopped. For instance, if the inter-signal signal confidence drops to zero and stays there, the companion software can pause the synthetic timeline sooner than the next synchronization signal (that is, before the anticipated arrival time of the expected next synchronization signal) e.g. by increasing a decay rate of the local confidence value.

The method of FIG. 3 begins with the companion device operating in a listening mode (S300). When operating in the listening mode, the companion device processes audio signals received via the microphone 108 to detect, when present, synchronization signals embedded in that audio as watermarks. Expected actions are intentionally not triggered in the listening mode.

At step S302, in the listening mode, if an initial synchronization signal is received at the companion device from the media device and decoded to obtain an initial reference time of a reference point in the media content, which is an initial reference point from the companion device's perspective, then the method proceeds to step S303. The initial reference point may for instance be the earliest reference point in the media content which is output by the media device upon, or shortly after, instigation of the delivery of the media content. Alternatively, the initial reference point may be any reference point in the media content which just happens to be the first reference point observed by the companion device e.g. because the delivery has commenced part way through the media content, the user has just walked into the room in which the media device is located with their companion device, or the user 102 has only just instigated execution of the companion application 202.

At S303, the local confidence value is adjusted by initially setting it to an upper limit (e.g. 100%), from which it subsequently decays (see below) and the method proceeds to step S308 at which the companion device enters a tracking mode.

If, in contrast, no synchronization signal is received at S302, the method proceeds instead to steps S304-S306 which may still result in the device entering the tracking mode; that is, the device may enter the tracking mode from the listening mode even without first receiving a synchronization signal—this is discussed below.

To commence the tracking, at step S310, the current media time instant is set to the initial reference time instant obtained by decoding the initial synchronization signal. That is, the tracking commences from that initial reference time instant.

Whilst operating in the tracking mode (S308), the companion device continues to monitor the microphone audio for new reference signals and also tracks the delivery of the media content by the media device for the purpose of triggering expected actions. In the tracking mode, both the media time value and the confidence value are continually updated by the companion device based on received reference signals and based on measurements of elapsed time between the companion device receiving those reference signals (see below). The media time value is continually updated to track the delivery of the media content by the media device and the confidence value is continually updated to reflect the current reliability of that tracking. The triggering of expected actions is conditional on the device being in the tracking mode (expected actions are not triggered in the listening mode).

At step S312, it is determined whether or not the current media time instant is that of a predetermined trigger point in the media content. This determination is made by accessing the set of associations 208 stored in memory 206. The set of associations may, for instance, be provided by a content creator or content provider along with the companion application software, and/or may be downloaded by or pushed to the companion device via the network 106.

Figure 5:
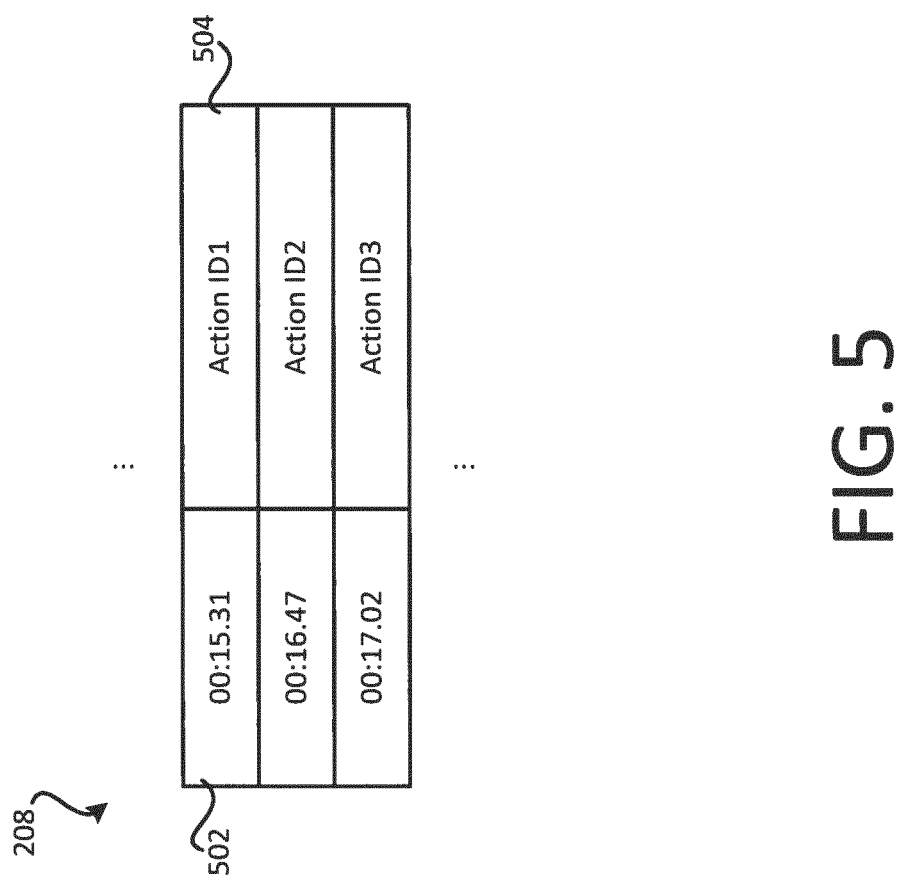
FIG. 5 is a schematic illustration of stored associations associating trigger time instants and expected companion device actions.

An exemplary set of associations 208 is shown in FIG. 5. As shown in FIG. 5, each of a plurality of time instants 502 of trigger points in the media content is associated with a respective identifier 504 of a respective expected action intended to be performed by the companion device at that trigger point in the delivery (that is when the media device, in delivering the media content, reaches that trigger point). If the current media time instant does correspond to (e.g. is equal or substantially equal to) a time instant of a trigger point, the method proceeds to step S314, at which the companion device is triggered to perform the expected action associated with that trigger point, and the method proceeds to step S316. For instance, the associated expected action identifier 504 associated with the time instant 502 of the trigger point may comprise an auxiliary content identifier, and the expected action may comprise obtaining the identified auxiliary content from the control server 122 and delivering (e.g. displaying) it to the user 102.

Conversely, if at S312 the current media time instant does not correspond to a time instant of a trigger point, the method proceeds straight to step S316, without an expected action being triggered.

In embodiments the set of associations may contain additional information which is used to determine how the method proceeds at S312. For example, the set of associations may comprise associations for different pieces of media content. In this case, each association comprises information that identifies the piece of media content to which it relates such as a content identifier or a channel identifier of a channel (e.g. broadcast channel) on which that piece of media content is expected to be transmitted. In this case, where the synchronization signals also identify the content to which they relate (e.g. by conveying a content or channel identifier), the method proceeds to S314 to trigger the expected action only if the content identified by the association matched the content identified by the most recent (i.e. most recently received) reference signal.

Moreover, alternatively or additionally, the associations may be user-dependent. For instance, the companion application 202 may have a user interface (e.g. display interface) by which the user can enter preference settings for different types of desired expected actions. These can then be stored by the companion application e.g. locally in memory 206 and/or at a server of network 106. For example, each expected action could be assigned to one or more categories by storing one or more category identifiers as part of each association. One category could relate, for instance, to expected actions related to objects/items in the media content, whereas another might relate to particular characters portrayed in the media content. The user's preferences can then be stored as a set of one or more user-preference category identifiers of categories in which they are interested, and an expected action triggered (S314) only if a category identifier associated therewith matches a user-preference category identifier.

At step S316, the method branches depending on whether or not a new synchronization signal has been received and successfully decoded to obtain a new reference time instant.

If, at S316, no new synchronization signal has been received, the method proceeds to step S317, at which a current elapsed time from receiving the most recent synchronization signal is measured. It is assumed that the transit time of the synchronization signals from the media device to the companion device, and any time taken to decode or otherwise process the received synchronization signal, is negligible, and that the measured elapsed time thus substantially represents the current elapsed time from the time instant of the reference point as conveyed by the most recent synchronization signal. The elapsed time may be measured using a clock signal for measuring time at the companion device e.g. provided by a real-time clock of the companion device 104.

At steps S318, the confidence value is decremented by an amount that is determined based on the measured current elapsed time and/or the measured signal confidence value where applicable. The manner in which that amount is determined is discussed below.

At step S320, it is determined whether or not the local confidence value has dropped below a lower threshold (e.g. of substantially 60%); that is, whether or not the local confidence value is within a first confidence value limit define by the range [0.6,1]. If so, the companion device stops tracking the media content and re-enters the listening mode (that is, the method returns to S300). If not, the method proceeds to step S322, at which the current media time instant is incremented based on the measured current elapsed time from receiving the most recent synchronization signal by an amount that substantially matches that elapsed time. That is, it is assumed that the delivery of the media content by the media device has progressed linearly by an amount that substantially matches the measured elapsed time from the most recent synchronization signal, and that by so incrementing the current media time instant, the incremented media time instant is substantially that of the current point in the delivery of the media content by the media device. The method then returns to step S312 where it is determined whether or not the incremented media time instant matches the time instant of a trigger point (that is, it is determined whether the measured elapsed time, as reflected in the incremented media time instant, substantially matches a time instant of a trigger point), with the associated expected action being performed at S314 if (and only if) so.

Thereafter, the method continued to loop recursively though steps S316-S312 (and S314 where applicable) until a new synchronization signal is received. In this manner, the media time instant is continually progressed to track the delivery of the media content (due to repeating S322) and the confidence value continually decays (due to repeating S318) to reflect the fact that the reliability of the media time instant is decreasing in the absence of further synchronization signals. That recursion is terminated either by the confidence value eventually falling below the lower threshold (S320), or responsive to receiving a new synchronization signal (S316).

When the local confidence value drops below the threshold (determined at S320), it is assumed that the delivery of the media content has been terminated, and the companion device returns to the listening mode. That is, in addition to providing an ongoing timer to track the media content, in this embodiment a confidence value is also provided which is used to determine whether or not the media content is actually still being delivered by the media device. If the confidence drops below the lower threshold level (e.g. 60%), this is taken to mean that the delivery of the media content has stopped or has been paused and, consequently the companion device halts its own ticking and returns to the listening mode.

As previously described, there are many cases in which an ACR signal may not be successfully received (poor sound quality, volume muted, user's hands covering microphone etc. . . . ). In embodiments, robustness to this is provided as follows.

The forecasting logic of the companion device maintains history of past synchronization signals is maintained and that history is used to predict when the companion device can be expected receive the next synchronization signal. An ACR signal may have a known frequency that can be anticipated. Alternatively, if this information is not known, a frequency can be inferred by calculating an ongoing average signal separation and a standard deviation.

The amount by which the confidence value is decremented at S318 is determined by a confidence value decay rate that is tuned so that the confidence value decays from, say, the upper limit (e.g. 100%) to the lower threshold value (e.g. 60%) over the duration of an acceptable wait interval. If no other synchronization signal is received during the acceptable wait interval, tracking is terminated and the companion device returns to the listening mode as a result of the recursion of S316-S312, if no other synchronization signal is received by then.

If the synchronization signal frequency is short (e.g. 4 seconds apart) then the confidence value ought to decay if 3-4 are missed since typical reasons why a signal would be missed include: user has hand over the microphone; a quiet part of the audio; lots of background noise—all of which might reasonably be presumed to result in less than approximately 20 s of signal absence or some other presumed interrupt duration. It is desirable to overlook such casual interruptions, so the confidence value should not have time to decay to the lower threshold during these episodes (i.e. it should not decay to the lower threshold in less than 20 s). However, if the synchronization signal frequency is long—e.g. if an ACR signal is only received once every 30 seconds or some other signal period that is longer than the presumed interrupt duration—the confidence value should decay all the way to 60% from 100% in 30 seconds. This is because at this sort of signal gap, the process has less frequent information to use. Were it to wait 3-4 times the signal period, its ability to accurately measure a genuine pause in the signal would be eroded.

Thus, the acceptable wait interval (the period over which the confidence value decays from 100% to the lower threshold in this embodiment) is selected as the larger of the typical interruption duration (e.g. 20 s) and the signal period.

Thus, as time ticks by towards the next anticipated signal, the confidence gradually fades. Tuning the rate of confidence value decay as above ensures that occasional synchronization signal losses do not terminate the tracking. However, a sustain period of synchronization absence will be sufficient to terminate the tracking. Thus, a balance is achieved between robustness to lost synchronization signals, whilst maintaining tracking only when that tracking is sufficiently reliable.

The current confidence value indicates a likelihood of the expected action being correctly triggered, as intended, when the media device, in delivering the media content, actually reaches the trigger point (which may not be the case if there is too much synchronization drift due to e.g. a sustained period of lost synchronization signals). The step of triggering is conditional on the confidence value being within a first confidence value limit (in this case, above the lower threshold) which defines an acceptable range of different confidence values that all indicate a sufficient likelihood of the expected action being triggered at the intended point in the delivery of the media content.

In this way, the synthetic timeline is protected against occasionally missed signals in a manner that allows it to continue ticking without interruption in all but the clearest cases of the delivery of the media content by the media device having paused or stopped. By tuning the acceptable wait interval (over which tracking continues in the absence of received synchronization signals) in the manner described above, poor quality signals do not affect the timeline immediately. Rather it is only after a trend of missed or poorly received signals that it is determined that the synthetic timeline should pause.

Thus, the step of triggering the expected action S314 is conditional on the current elapsed time from a time instant of a reference point being within an acceptable wait interval from that time instant of that reference point. Outside of the acceptable wait interval, the expected actions are not triggered unless a new reference signal is received (in which case a new acceptable wait interval runs from the time instant of the reference point of that new signal).

As indicated, in some embodiments, a signal confidence value (e.g. signal strength) is determined (that is, measured), and this measured signal confidence value is used to boost the timeline's own local confidence value between expected ACR signals—that is, in some embodiments, the decay rate of the local confidence value is lower (slower decay) if the measured signal confidence (e.g. signal strength) is currently at a higher level. If the carrier drops out between signals, then the timeline's confidence similarly drops more rapidly—that is, the decay rate of the local confidence value is higher (faster decay) if the measured signal confidence (e.g. signal strength) is currently at a lower level. For systems that do not provide these features, the value starts falling immediately after each heartbeat's reception at a predetermined 'default' decay rate.

As mentioned, the measured signal confidence value may fluctuate erratically. So as to prevent resulting erratic behaviour of the synthetic timeline, the local confidence value may be adjusted based on (e.g. be set substantially equal to, or otherwise based on) a smoothed out moving (temporal) average of the measured signal confidence value (e.g. with a window size of order seconds).

In some embodiments, due to the local confidence tracking the signal confidence, an increase in the signal confidence value can in fact result in an increase (rather than a decay) in the local confidence value if the local confidence value is tracking the signal confidence value in this or some other manner, even if no new synchronization signal is received to reset the local confidence value to the upper limit (e.g. 100%). Thus, as mentioned above, the device 104 can in fact enter the tracking mode from the listening mode (e.g. when the device has re-entered the listening mode due to the delivery of the content having been paused) before receiving any synchronization signal. This is because, in embodiments where the signal confidence value is tracked by the local confidence value, high signal confidences value may bring the device 104 out of the listening mode before any such signal is received, as will now be explained.

Returning to step S302, is no synchronization signal has been received at step S302, the method proceeds to S304 where the local confidence value is adjusted based on the measured signal confidence. Step S302 performed in the listening mode is equivalent to step S318 performed in the tracking mode, and the measured signal confidence value is adjusted in the same way. At step S306, the it is determined whether or not the local confidence value exceeds an upper threshold of e.g. 70%; that is, whether it is within a second confidence value limit defined by the range e.g. [0.7,1]. If the signal confidence value does not exceed the upper threshold (that is, if it is not within the second confidence value limit), the companion device remains in the listening mode (S300).

If, however, the local confidence value does exceed the upper threshold (e.g. 70%), then the device 104 returns to the tracking mode even though no synchronization signal has been received to trigger that change of mode. As will be appreciated, in embodiments where measured signal confidence is not user, steps S304 and S306 may be omitted.

In such embodiments, the tracking may resume (e.g. when the local confidence exceeds the upper threshold) with the current media time updated based on the elapsed time since receipt of the most recent synchronization signal (as a new reference time will not be available at that point as no new synchronization signal has been received at that point).

Returning to the tracking mode and step S316 in particular, when (and if) a new synchronization signal is received and successfully decoded to obtain a new reference time instant in the tracking mode, the method proceeds to S324, at which the local confidence value is adjusted by resetting it to the upper limit (e.g. 100%) at S324.

At S326, the current media time instant is set to the new reference time instant. This will likely result in a (possibly slight) change in the media time instant as the media device and the companion device are effectively resynchronized to account for any synchronization drift between synchronization signals.

Thus, if the next signal is received before the local confidence value has decayed below the lower threshold, the confidence resets and the synthetic timeline continues uninterrupted.

To illustrate the principles behind the local confidence value, five exemplary scenarios will now be considered for the sake of illustration. Scenarios A and B serve to illustrate synthetic timeline behaviour embodiments in which no signal confidence value is used; in contrast, scenarios C, D and E serve to illustrate synthetic timeline behaviour in which a measured signal confidence value is used. Scenarios A-E are illustrated in FIGS. 8A-8E respectively, which show graphs of exemplary changes in the local confidence value and the signal confidence value where applicable (on the horizontal axes) as a function of time (on the vertical axes). The local signal confidence value is shown as a solid line 802 in each of FIGS. 8A-8E; the signal confidence value is shown as a dotted line 804 in each of FIGS. 8C-8E; a dashed line 806 is used to illustrate whether the device is operating in the tracking mode (logical high) or the listening mode (logical low).

Scenario A:

In this scenario, a system that simply receives periodic signals or not is considered; there is no signal strength or confidence value provided by the underlying technology of the system. A first signal is received at time t1 at which point the synthetic timeline starts to play (see the dashed line 806). Here we see that the signal is always received at the expected times (t2, t3, t4, t5, . . . ), never missed. The local confidence value 802 is decayed evenly between each one and is reset to 100% each time the signal is heard. The local confidence never falls below the lower threshold (e.g. 60%), so the synthetic timeline which began playing at the first signal (t1) continues playing throughout.

Scenario B:

Similarly, in this scenario, a system that simply receives periodic signals or not is again considered; again, there is no signal strength or confidence value provided by the underlying technology of the system. A first signal is received at time t1 at which point the synthetic timeline starts to play (see the dashed line 806). The local confidence 802 decays at the same rate as in scenario A. Here, however, a second expected synchronization signal is not received at t2 (for whatever reason). This gives the local confidence value time to decay below the lower threshold (e.g. 60%). At this point (time t6) the synthetic timeline is paused (that is, the device leaves the tracking mode and enters the listening mode to prevent expected actions from being triggered). When the next signal is heard at t3, the local confidence resets to 100% and the synthetic timeline resumes (that is, the device re-enters the tracking mode).

Scenario C:

In this scenario, a system is provided with an underlying technology which gives us periodic signals and does also provide a signal confidence value 804 (e.g. signal strength) of its own. The local confidence value 802 is a smoothed out moving average of this value which resets to 100% when a signal is successfully heard. As illustrated, the signal confidence value 804 (e.g. signal strength) affects the local confidence value 802 but not enough to make it drop below the lower threshold (e.g. 60%) despite the second signal being missed at time t2. The smoothing out of this erratic signal strength/confidence value keeps the synthetic timeline going (that is, keeps the device in the tracking mode) because the presence of some signal confidence (e.g. signal strength) suggests that there's still a chance of hearing the next periodic signal.

Scenario D:

This scenario is similar to D except the signal confidence 804 (e.g. signal strength) drops off more definitely after the first received signal at t1. This drags the smoothed out local confidence 802 down more directly and, as such, causes it to drop below the lower threshold (e.g. 60%) sooner (at time t7) than the time t2 at which the second signal would be heard. This is beneficial because it allows the synthetic timeline to be paused (i.e. the tracking mode to be exited) before a signal is even missed because it can be intuited from the low signal confidence (e.g. signal strength) that there will in fact be no signal at t2 (because the carrier is unlikely to be capable of conveying that signal). When the third signal is heard at time t3, this resets the local confidence 802 to 100% and the synthetic timeline is resumed again.

Scenario E:

Similar to scenario C but here two signals, expected at times t2 and t3, are missed. The signal confidence 804 (e.g. signal strength) drops quickly and causes the synthetic timeline to be paused at time t8. However, the signal confidence 802 (e.g. signal strength) recovers enough for it to rise above the upper threshold (e.g. 70%) at time t9 even before the next signal is detected at time t4. The synthetic timeline therefore resumes (i.e. the device enters the tracking mode) at time t7. At this point the synthetic timeline may be slightly out of sync, but this is adjusted when the next signal is successfully received at t4.

Returning to FIG. 3, at step S328 it is determined whether or not the change in media time instant (if any) at S326 is within a limit. For instance, that limit may be a range of times e.g. [x,y] and it may be determined whether the change falls outside of that limit. If so, the method proceeds to S330 at which a skip action is triggered as the change being outside of this limit indicates that the delivery of the media content has been skipped e.g. rewound or fast-forwarded. If the signalling technology indicates the delivery is further back than the last synchronization signal, the skip action that is triggered is a rewind action; if the signalling technology indicates the delivery to be ahead of the tracking by more than one signal gap, the skip action that is triggered is a fast-forward action.

Suppose a viewer pauses an item of content and rewinds it. When the next heartbeat signal is received by the device it will contain an offset markedly different from the one it was expecting. This does not adversely impact on the tracking, as the response by the companion device is simply to adjust its offset value (at S326) and continue ticking. This ensures that any events attached to the timeline will still trigger as expected.

An additional feature of this embodiment however is to perform a rewind action whenever this is detected at step S328 e.g. to send an event within the device to indicate a rewind event. This allows the device to refresh its current state to the one it would have had had it arrived at this new offset normally. The same behaviour applies to fast-forward events as well so no matter how the viewer jogs the playback, the device is able to keep in step.

The skip action may comprise displaying auxiliary content at the companion device to match the new current point in the delivery (reached by skipping). For example, in a quiz-show context, the companion device may be used to show quiz questions in time with the questions being asked on the show. During Round 1, the theme is Sports questions and the companion app has a corresponding sports-related background image. During Round 2, the theme is Movies with a different background image. The user watches through to Round 2 but then uses their DVR functionality on whatever their playback device is and skips back to Round 1. The companion app detects the rewind and raises this as an event within the companion app. In response, the companion app display screen resets whatever it had on screen to what it would have been had the user played to the new cue point from the start.

The method then once again proceeds to S312.

Conversely, if at S328 it is determined that the change in the media time instant is within the limit—indicating that the delivery of the media content has not been skipped—the method proceeds straight to S312.

At S312 is determined whether the current media time instant (as updated in response to the new synchronization signal) is that of a trigger point, and the associated expected action is triggered if so (S314). The method continues to repeat in the tracking mode until the confidence value drops below the lower threshold, and the method returns to S300 with the companion device in the listening mode.

It should be noted that the media time instant that corresponds to an associated expected action at S312 may not correspond to a reference time instant as conveyed by any synchronization signal, but may be an incremented media time as incremented at S322 based on the current measured elapsed time from the most recent synchronization signal. That is, the trigger points in the media content may well be different from the reference points in the media content.

This is illustrated in FIGS. 4A and 4B. FIG. 4A shows a synchronization signal 400 conveying a reference time instant transmitted when the media device, in delivering the media content, reaches a reference point. In this example, that reference point is not a trigger point so no expected action by the companion device is triggered. FIG. 4A shows the companion device and media device at a later time at which the media device does reach a trigger point (when the bicycle 402 becomes visible—see above). No synchronization signal is transmitted at that point, but an expected action (the display of the synchronization element 404 by the companion device—see above) is nonetheless triggered as, at that point, the measured elapsed time from the synchronization signal 400 as reflected in the incremented media time instant substantially matched the time instant of that trigger point.

Advantageously, the behaviour of the companion device during the delivery of the media content can be adapted without having to adapt the manner in which synchronization signals are transmitted. For instance, if a content provider wishes to trigger a new companion device action at a new trigger point for an existing piece of media content, they do not have to e.g. modify the audio of that content to transmit any new synchronization signals (indeed, it may be that the creator of the media content has control over the manner in which synchronization signals are embedded in the audio therefore, but that the content provider does not), but can simply convey (e.g. over network 106) to the companion device a new association between the new trigger point and the new expected action.

If the media content delivery starts up again while the companion device is in the listening mode, the transmission of synchronization signals (embedded in the media content audio) resumes and when the next one is received the synthetic timeline offset adjusts appropriately and resumes ticking. In embodiments where a signal confidence value is provided for synchronization signals, that resumption may be conditional on receiving a synchronization signal with a signal confidence value above the upper threshold e.g. 70% (by virtue of S304).

By choosing this upper threshold value (e.g. 70%) to be above the lower threshold value (e.g. 60%) below which tracking is terminated (at step S320)—that is, by choosing a first local confidence value limit (e.g. [0.6,1]) which does not match the second signal confidence value limit (e.g. [0.7,1])—hysteresis is introduced which prevents undesired oscillation between the listening mode and the tracking mode.

Embodiments thus provide the ability to prevent short-term interruptions of the heartbeat signal affecting the synthetic timeline and the ability to support different confidence decay approaches.

Whilst in the above described embodiments, synchronization signals are embedded in the audio of the delivered media content (a form of ACR), in other embodiments synchronization signals may be communicated using a number of different technologies, including but not limited to via an IP (e.g. WiFi) link, Bluetooth link, other form of Near Field Communication (NFC) link etc., to periodically convey (e.g. broadcast) the current asset offset (remote time). That is, synchronization signals may be receiver over a wireless communication link via a network interface (e.g. 105 of another network interface) of the companion device.

For a Wi-Fi connection delivering a heartbeat over IP or a broadcast Bluetooth signal, as with ACR, there is no guarantee that such signals will be received consistently, thus the various advantages of the invention and particular embodiments thereof are still realized. Further, as discussed, ACR technologies provide instantaneous signal confidence values which may be used to inform the decay process of the local confidence value—Bluetooth LE uses a signal strength value which can be used in a similar way if the synchronization signals are received as Bluetooth signals.

The disclosure has considered one device (media device) driving the synthetic (slave) timeline on another device (companion device): a master time source with a slave timeline that is linked to it via heartbeat signals. This concept can be extended in the following manner.

Once the slave timeline has achieved a consistent accuracy then it too can become a source of time information for other (companion) devices. This retransmission of timing data could be used for creating timeline accuracy within large groups of users where not all of them have direct access to the origin time-source e.g. where they are too far from a loudspeaker transmitting embedded synchronization signals. Examples here are sporting events that users attend in person, but also music events, conventions and conferences, and so on.

Figure 6:
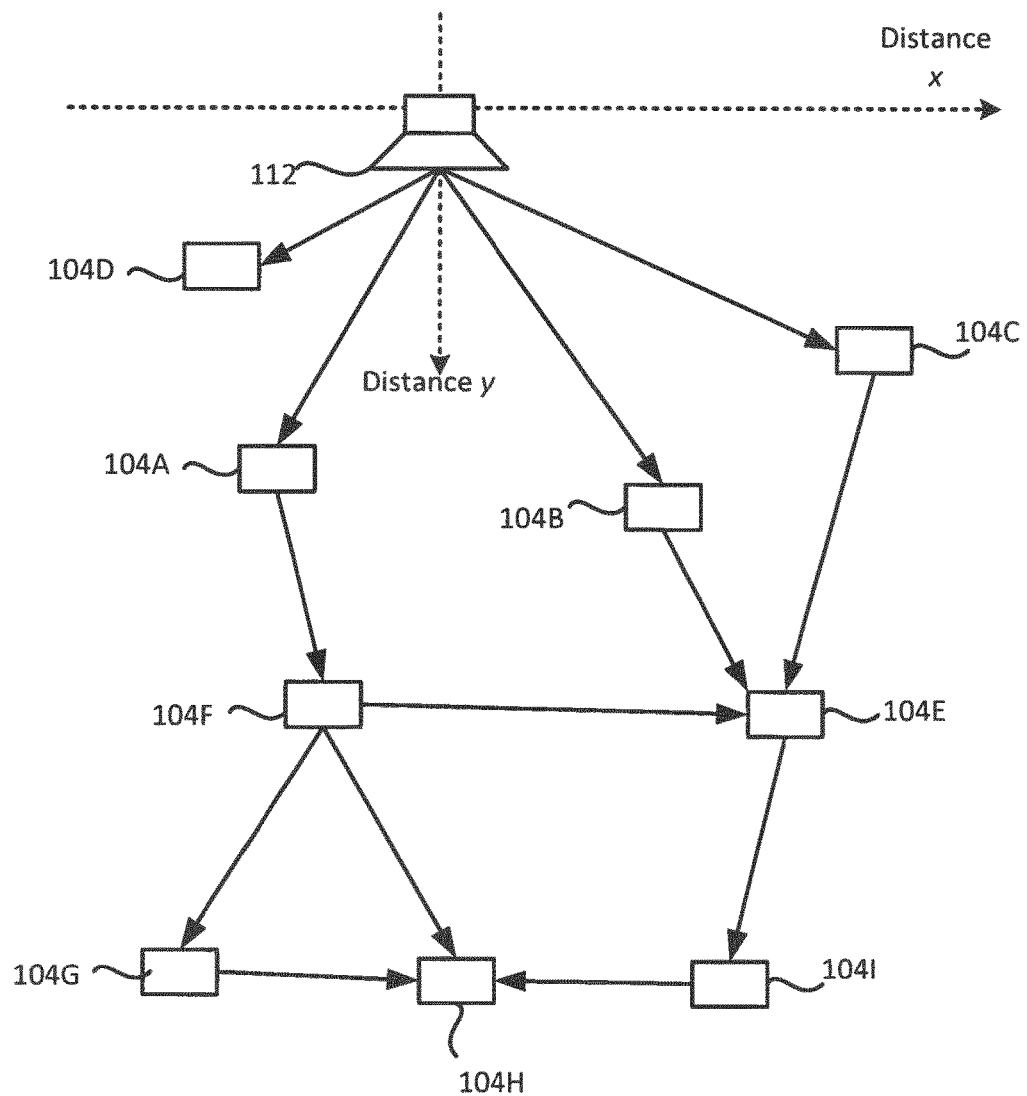
FIG. 6 is a schematic overview of a collection of companion devices.

An example of this is illustrated schematically in FIG. 6. FIG. 6 shows a system of companion devices comprising a collection of companion devices 104A-H and a master synchronization source, such as a loudspeaker 112 of a media device or some other synchronization signal source (e.g. transmitting Bluetooth/WiFi/other NFC synchronization signals), in the same location (e.g. in a room). The master synchronization source is configured to transmit synchronization signals of the kind described above, which are embedded in the media content audio as watermarks in this embodiment.

The master source 112 has a location that defines an origin of a coordinate system in which the companion devices 104A-I are located at different distances from the origin. Companion devices A-D are shown able to receive synchronization signals, and the timing information that they convey, directly from the loudspeaker 112. These devices can thus implement the method of FIG. 3, described above, in order to track the delivery of the media content. Companion devices E and F are shown as being unable to receive synchronization signals directly from the loudspeaker 112, but are able to receive data from companion device A, and companion devices B and C, respectively via some other communication channel e.g. Wi-Fi or Bluetooth. Companion device E is also able to receive data from companion device F over such a channel. Companion devices G, H and I are not able to receive data from companion devices A, B or C e.g. because they are too far away. However, device G can receiver data from device F, device H can receive data from devices F, G and J, an device J can receive data from device E over respective wireless communication channels.

The collection of companion devices 104A-I constitute a wireless network of interconnected companion devices, connected by way of e.g. Bluetooth and/or Wifi. The interconnection is a partial interconnection (that is, not every device can communicate directly with every other device) due to the limited range of the WiFi/Bluetooth signals that effect that communication.

A method of synchronizing a companion device, in a network of companion devices, with a delivery of a piece of media content will now be described with reference to FIG. 7, which is a flow chart for the method. This method is performed separately by each of the companion devices 104A-I in FIG. 6. Each companion device 104A-I has a constitution as shown FIG. 2, and each executes a respective instance of the companion application 202 which is configured to implement the method of FIG. 7 in this embodiment. Connections in the wireless network, by which data can be transmitted and received between companion devices, are via the network interface 105 and/or another network interface (e.g. Bluetooth interface) not shown in FIG. 2A.

At S702 it is detected whether the master synchronization source (e.g. the loudspeaker 112) is available to the companion device; that is, whether the companion device is able to receive the synchronization signals from the master source. If the master source is available (as is the case for companion devices A-D), the companion device selects a first mode of operation (direct synchronization mode) wherein the method proceeds to step S704, at which the companion device determines timing information relating to a current point in the delivery of the media content based on the reference signals from the master source. At step S706, when the determined timing information indicates that the media device, in delivering the media content, has reached a trigger point, this triggers the companion device to performs an expected action associated with that trigger point.

Figure 7:
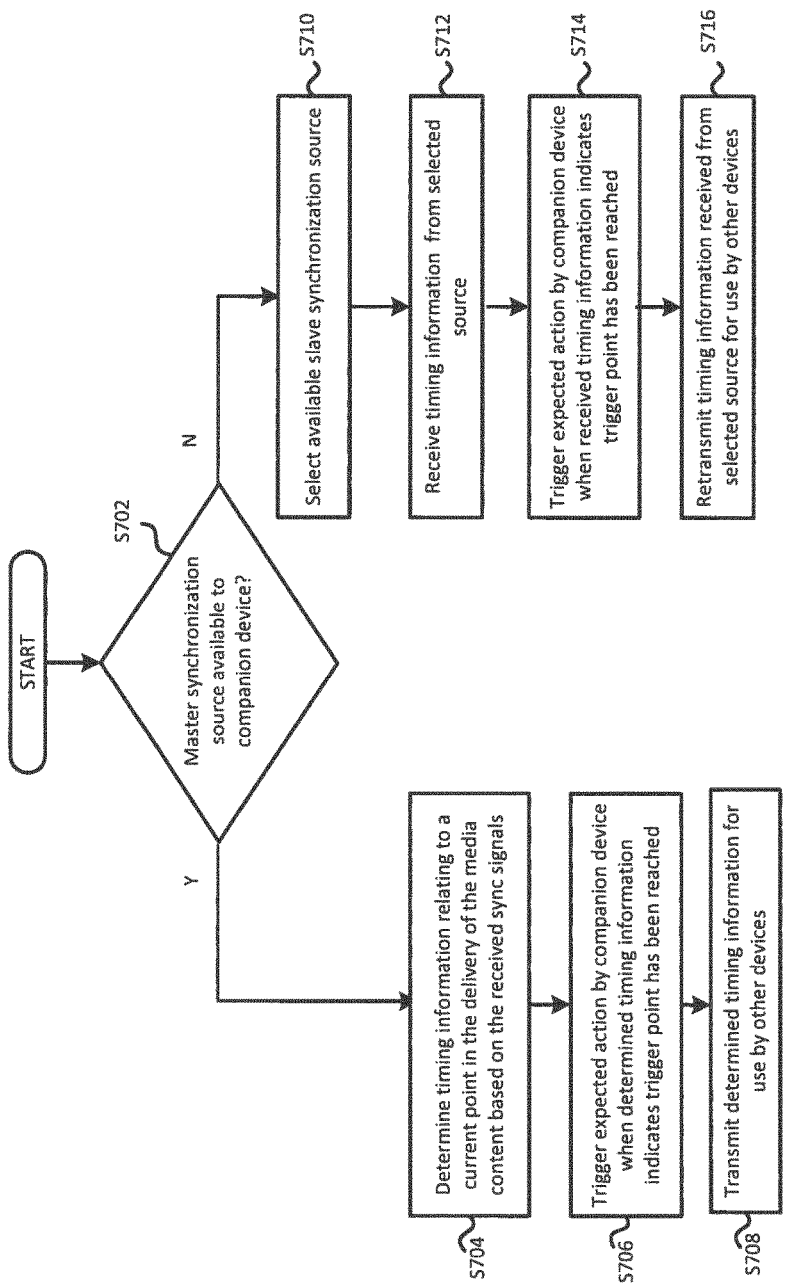
FIG. 7 is a method of synchronizing a companion device in a wireless network of companion devices.
Figure 8A:
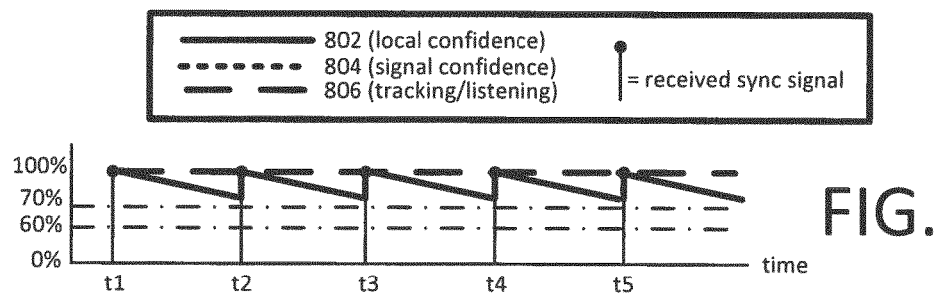
FIGS. 8A-8E are graphs showing confidence value behaviour over time in exemplary scenarios.
Figure 8B:
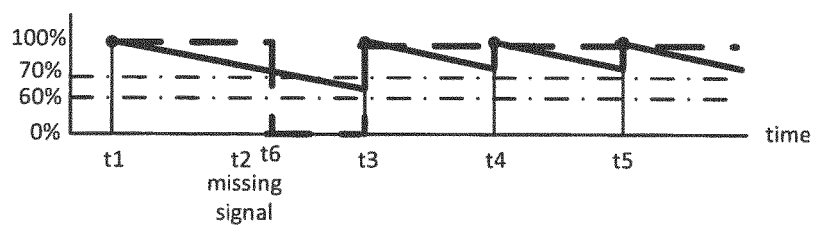
Figure 8C:
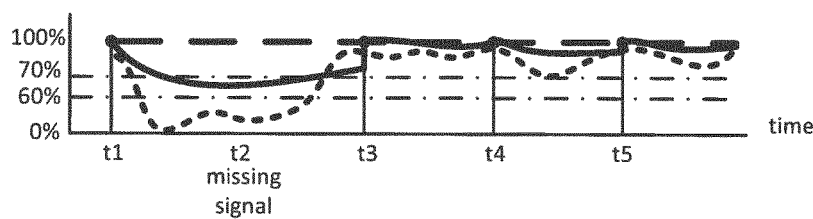
Figure 8D:
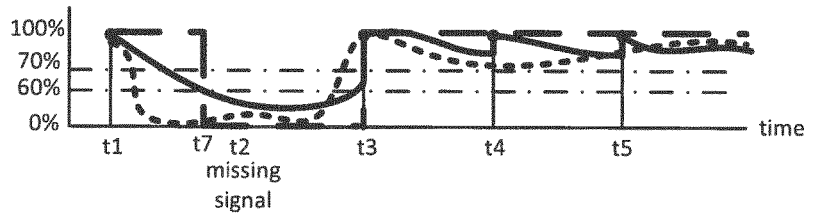
Figure 8E:
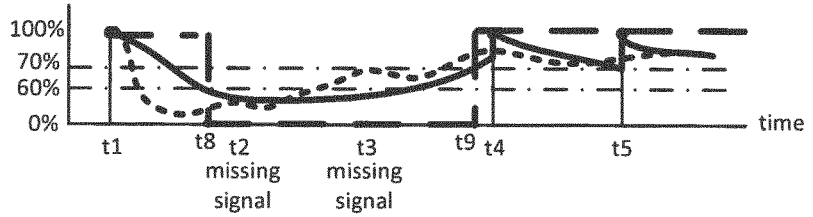

Steps S704-S706 may be implemented by carrying out the method of FIG. 3, described above, wherein the current media time instant determined in performing the method of FIG. 3 constitutes the timing information as determined at step S706 of the method of FIG. 7. Advantageously, using the method of FIG. 3 ensures that a companion device is able to act as a sufficiently accurate source of timing information for other companion devices, thereby minimizing the propagation of timing inaccuracies throughout the network.

Alternatively, steps S704-S706 may be implemented in some other way e.g. using known ACR techniques such as those described above.

At step S708, the companion device transmits the determined timing information for use by other devices, in particular other devices to which the master synchronization source 112 is not available e.g. companion devices 104E-I.

If at step S702 it is determined that the master synchronization source is not available to the companion device (which is the case for devices E-I), the companion device selects a second mode of operation (indirect synchronization mode) wherein the method proceeds to step S710, at which the companion device selects a slave synchronization source from one or more available slave synchronization sources—that is other companion device(s) that are transmitting timing information for use by the companion device. This selection may be based on one or more of a number of factors, discussed below. At step S712, the companion device receives the timing information from the selected slave source. At step S706, when the received timing information indicates that the media device, in delivering the media content, has reached a trigger point, this triggers the companion device to perform an expected action associated with that trigger point. For instance, where the received information is the current media time instant determined by another companion device in performing the method of FIG. 3, the expected action is triggered when the received current media time instant corresponds to that of the trigger point. At step S716 the companion device (e.g. E, F) retransmits the timing information for use by other devices e.g. devices which are not in range of the selected synchronization source by are in range of the retransmitting companion device (e.g. G, H, I).

Thus, where only a few companion devices have direct access to the origin heartbeats from the master synchronization source 112 (e.g. because this signal is limited in availability/reach), those companion devices A-D which do achieve synchronisation using the method of FIG. 3 can then be used to drive the synchronisation of those devices E,F that are further away from the origin by broadcasting timing information derived using the method of FIG. 3, e.g. by rebroadcasting the current media time instant as determined at each iteration of steps S310, S322, and S326 as applicable. The devices E, F can, in turn, rebroadcast that timing information to those device G, H, I that are further away still from the origin.

From the perspective of a particular companion device able to receive timing information from other companion device, these other companion devices constitute slave synchronization sources (which are slaves to the master synchronization source i.e. the loudspeaker 112 in this embodiment) that can be used to obtain timing information, albeit indirectly, whenever they are in range of that particular companion device.

Devices which broadcast and rebroadcast timing information also include their approximate distance from the origin together with an identifier of their immediate upstream provider (master source or selected slave source, as applicable). In this way, downstream receivers, which might therefore have a range of timing signals available to them, can select the one closest to the origin at S710.

The distance from a particular device to the origin is measured by the number of devices that device is distant from the origin—that is, in terms of a degree of separation from the master synchronization source 112 defined in terms of the number of intermediate devices via which synchronization information is relayed. That is, each device A-D knows of its current ability to receive and use synchronization signals directly from the master source 112, and thus assigns itself a minimum distance measure of, say, "0" that is visible to devices E and F. Devices E and F can see they are currently capable, at best, of receiving timing information from devices which have an assigned distance measure of "0", therefore these devices assign themselves a higher distance measure of say "0+1=1" that is visible to devices G, H and I. Devices G, H and I can see that they are currently capable, at best, of receiving timing information from devices that have an assigned distance measure of "1", and thus assign themselves a distance measure of say "1+1=2".

Because device E is capable of also receiving data from device F as well as devices B and C, it can also see that it is capable of receiving timing information from a device with an assigned distance measure of "1" (device F). However, because it can also receive information from devices closer to the origin i.e. with a distance measure of 0 (B and C), it selects one of these devices B, C in preference over F as device E can obtain more direct synchronization information from device C. Similarly, device H will elect (at S710) to receive timing information from device F as opposed to device G or H as device has the lowest distance metric visible to device H.

Moreover, in embodiments, the inclusion of an immediate upstream provider identity is useful too e.g. where device G receives timing information from device F (which itself receives timing information from device A), an identifier of device F; where device H also receives timing information from device F, again, the identifier of F.

For example, at a large conference, a video presentation may have an audio track that has ACR signals embedded in it or it may transmit some other form of master synchronization signals e.g. Bluetooth/Wifi. Those devices closest to the audio all synchronise using ACR (Devices A, B, C) and rebroadcast this signal using e.g. Bluetooth or some other form of Near Field Communication (NFC) signal.

Those further away who are not able to detect the audio (or, in general, the master synchronization signals) because of e.g. background noise, low signal strength etc. are able to detect the Bluetooth signals of those devices nearest to them. Those further away again do the same.

In the event that the user holding device H moves so that device H loses contact with device F, but is nonetheless able to receive signal from devices G and J both of which have the same assigned distance metric of "2", the question arises as to which signal device H use since both devices G and I are the same distance from the origin. By looking at the upstream source (master or slave) for both, device H can see that device G is in contact with F—its previous source, but that device I is in contact with some other source (specifically device E). Device H therefore selects (at S710) device G one on the basis that G is more likely to be closest to its current synchronisation accuracy than I.

As will be appreciated, the concept of synchronising a timeline on one device based on signals on another can be extended beyond video playback. The ticking progress along a video timeline is just one application. Timers; progress indicators; ordered sequences of interactivity or presentation can also be similarly synchronised.

The above-described embodiments have been described with reference to companion software executed on a companion device other than the media device. However, in alternative embodiments the companion software (e.g. companion app) may be executed on the media device itself. That is, the media device may comprise a processor corresponding to the processor 202 and a memory corresponding to the processor 206 holding companion device software (e.g. the companion app 202) for execution on the processor. In this case, the synchronization signals may be received via an input device (e.g. microphone) of the media device, or they may be received via some other input such as an internal software interface (e.g. as provided by sound card driver software) of the media device. That is, the synchronization signals may be transmitted and received internally within the media device.

In other words, the disclosed techniques can be implemented by any suitable computer system, which may for instance be embodied in the companion device or in the media device itself.

Even if the companion software (e.g. companion app) and e.g. playback software (e.g. playback app) configured to perform the delivery of the media content are executed on the media same device, then may not have direct access to each other's playback state or synthetic timeline directly (e.g. which may be the case if the two sets of software are provided by different vendors). Embodiments where the companion software runs on the media device are particularly useful where such direct access is unavailable.

Whilst in the above, a return to the listening mode in the method of FIG. 3 is triggered by a confidence value falling below a threshold, in other embodiments this may be effected in different ways. For instance, this mode switch may be triggered when the measured elapsed time from the most recent synchronization signal excess a time threshold, that threshold defining the acceptable wait interval and corresponding to e.g. the expected time it would take for the companion device to receive, say, 3 to 5 synchronization signals. Further, whilst in the above the set of association between trigger points and expected actions, in other embodiment this set may be stored remotely e.g. at a server of network 106, and access remotely via the network 106 by the companion application. Further, whilst in the above, a confidence value in the range [0,1] is used, in other embodiment the confidence value may lie in any desired range. Moreover, whilst in the above higher (resp. lower) confidence values indicate higher (resp. lower) reliabilities, this may be revered in other embodiments such that lower (resp. higher) values indicate higher (resp. lower) reliabilities. Further, whilst in the above the method of FIG. 3 is implemented by the companion device, in other embodiments at least some of the steps of FIG. 3 may be implemented remotely e.g. at a server (e.g. 122) of the network 106 with which the companion device can communicate.

It will be appreciated that the above embodiments have been described only by way of example, and other variants or applications may be apparent to a person skilled in the art given the disclosure herein. The scope is not limited by the described examples but only by the following claims.

What is claimed is:

1. A computer-implemented method of synchronizing a companion device, in a network of companion devices, with a delivery of a piece of media content by a media device, the method comprising:
   detecting whether a master synchronization source is available to the companion device,
   wherein if the master synchronization source is available to the companion device, operating in a first mode of operation, the first mode of operation comprising:
      receiving at the companion device synchronization signals from the master synchronization source, the synchronization signals transmitted when, in delivering the media content, the media device reaches respective reference points in the media content, wherein the synchronization signals convey respective time instants of those reference points;
      determining timing information relating to a current point in the delivery of the media content based on the received synchronization signals; and
      transmitting the determined timing information for use by other companion devices in the network,
   wherein if the master synchronization source is not available to the companion device, operating in a second mode of operation, the second mode of operation comprising:
      receiving from another companion device in the network timing information relating to a current point in the delivery of the media content; and
      selecting the other companion device for receiving the timing information from a plurality of other companion devices in the network that also transmit respective timing information and receiving, from each of the plurality of other companion devices, a respective distance measure indicative of a distance from that companion device to the master synchronization source, wherein the other companion device is indicated to be closest to the master synchronization source and is selected on that basis, wherein the respective distance measure conveys a respective number of intermediate companion devices via which that companion device is connected to the master synchronization source, the other companion device being connected to the master synchronization source via the smallest number of intermediate companion devices and being selected on that basis.

2. The method of claim 1 further comprising:
accessing computer storage holding an association of an expected action with a time instant of a trigger point in the media content; and
triggering the companion device to perform the expected action when the determined timing information indicates that the media device, in delivering the media content, has reached the trigger point.

3. The method of claim 1 further comprising the companion device transmitting a distance measure which indicates that the master synchronization source is available to the companion device, the transmitted distance measure for use by other companion devices in the network in selecting that companion device as a synchronization source.

4. The method of claim 1 further comprising the companion device transmitting a device identifier of the companion device for use by other companion devices in the network in selecting that companion device as a synchronization source.

5. The method of claim 1 further comprising:
accessing computer storage holding an association of an expected action with a time instant of a trigger point in the media content; and
triggering the companion device to perform the expected action when the received timing information indicates that the media device, in delivering the media content, has reached the trigger point.

6. The method of claim 5 comprising retransmitting the received timing information for use by other companion devices in the network.

7. The method of claim 5 comprising the companion device transmitting a device identifier of the companion device for use by other companion devices in the network in selecting that companion device as a synchronization source.

8. A computer program product comprising executable code stored on a non-transitory computer readable storage medium, the code configured when executed to implement the method of claim 5.

9. The method of claim 1 wherein the smallest number of intermediate companion devices is zero.

10. The method of claim 1 comprising the companion device transmitting a further distance measure for use by further companion devices in the network in selecting that companion device as a synchronization source, the further distance measure based on the respective distance measure received from the other companion device.

11. The method of claim 1 comprising receiving a respective device identifier transmitted by each of the plurality of other companion devices, wherein the step of selecting is based on the respective device identifier of the other companion device.

12. A computer program product comprising executable code stored on a non-transitory computer readable storage medium, the code configured when executed to implement the method of claim 1.

13. A companion device for use in a network of companion devices, the companion device comprising:
- a network interface;
- a processor configured to detect whether a master synchronization source is available to the companion device and if so to select a first mode of operation; and
- an input configured when operating in the first mode to receive from the master synchronization source synchronization signals transmitted when, in delivering a piece of media content, a media device reaches respective reference points in the media content, wherein the synchronization signals convey respective time instants of those reference points;
- wherein the processor is configured, when operating in the first mode, to determine timing information relating a current point in the delivery of the media content based on the received synchronization signals; and
- wherein the network interface is configured to transmit the determined timing information for use by other companion devices in the network, and
- wherein the processor is configured, if it is detected that the master synchronization source is not available to the companion device, to detect a second mode of operation,
- the companion device further comprising a network interface configured, when operating in the second mode, to:
- receive from another companion device in the network timing information relating to a current point in a delivery by a media device of a piece of media content,
- select the other companion device for receiving the timing information from a plurality of other companion devices in the network that also transmit respective timing information and receive, from each of the plurality of other companion devices, a respective distance measure indicative of a distance from that companion device to the master synchronization source, wherein the other companion device is indicated to be closest to the master synchronization source and is selected on that basis, wherein the respective distance measure conveys a respective number of intermediate companion devices via which that companion device is connected to the master synchronization source, the other companion device being connected to the master synchronization source via the smallest number of intermediate companion devices and being selected on that basis.

14. The companion device of claim 13 wherein the processor is further configured when operating in the first mode to access computer storage holding an association of an expected action with a time instant of a trigger point in the media content, and to trigger the companion device to perform the expected action when the determined timing information indicates that the media device, in delivering the media content, has reached the trigger point.

15. The companion device of claim 13 wherein the processor is further configured when operating in the second mode to access computer storage holding an association of an expected action with a time instant of a trigger point in the media content, and to trigger the companion device to perform the expected action when the received timing information indicates that the media device, in delivering the media content, has reached the trigger point.

* * * * *